Patented June 22, 1937

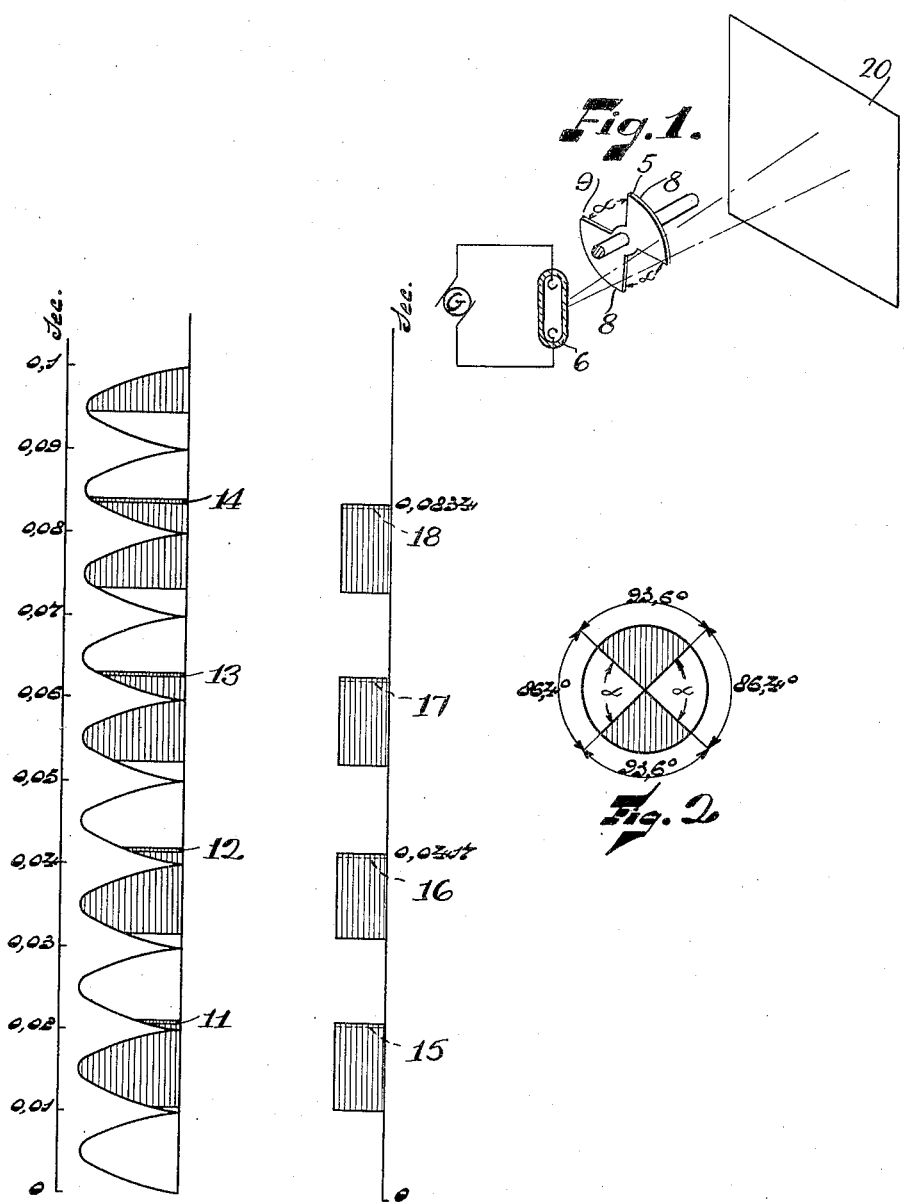

2,084,525

UNITED STATES PATENT OFFICE 2,084,525

SHUTTER FOR PICTURE RECORDING OR REPRODUCING APPARATUS

Willem Elenbaas, Eindhoven, Netherlands, assignor to N. V. Philips' Gloeilampenfabrieken, Eindhoven, Netherlands Application March 15, 1935, Serial No. 11,365
In Germany December 3, 1934

4 Claims. (Cl. 88—19.3)

The invention relates to shutter devices for apparatus in which use is made of one or more light sources having periodically varying light emission. My invention is particularly adapted for use in recording or reproducing picture films by means of the above-mentioned light sources; in recording, the light sources being used for illuminating the object to be photographed, whereas in reproducing, the light sources being used for projecting the picture.

When using such light sources for either or both of the above purposes, a troublesome flicker is generally produced during projection of the pictures, which greatly mars the reproduction. The invention provides means for removing this drawback.

According to the invention, the shutter device is so constructed that the time of each exposure of the film is equal to, or is a whole multiple of the duration of a period of the light emission. With shutter devices according to the invention equal quantities of light pass through the shutter during each period of time in which the picture is being recorded or reproduced.

The invention is of particular importance in connection with gas- or vapour-filled discharge tubes. If such a tube is fed by alternating current, the quantity of light radiated is substantially proportional to and in phase with the intensity of the current passing through the tube because the thermal capacity of such tubes may be neglected. This results in the production of considerable periodical fluctuations in the emission of light. My invention is particularly adapted for use with water-cooled high-pressure mercury vapour filled tubes as described in the U. S. Patent Application Ser. No. 46,952 to Cornelis Bol et al., filed October 26, 1935, which are particularly suitable for projection purposes.

The invention will be explained more fully while applied to a cinematograph projector.

In order that my invention may be clearly understood and readily carried into effect it will be more fully explained in connection with the accompanying drawing, in which:

Figure 1 is a perspective diagrammatic view of a shutter device and a light source having periodically varying light emission;

Fig. 2 is a side view of a shutter disc in accordance with the invention;

Figs. 3 and 4 are diagrams for use in explaining the invention.

As is well-known, in apparatus in which the film is intermittently or continuously carried forward, the projecting of the picture is periodically interrupted during the passage from one picture to the next one to prevent the so-called "travel-ghost" of the picture projected. Usually, however, the projection of each picture is also interrupted once or several times as otherwise the projected picture would flicker due to the large difference between the projection period and the masking period.

In connection therewith it is customary to construct the shutter device in such manner that the time elapsing between the moments at which successive pictures are brought before the picture gate is divided into four equal periods. In the first period the picture is carried before the gate, in the second period it is projected, in the third period it is masked, and in the fourth period it is again projected. The shutter device commonly used consists of a shutter disc rotating with the picture frequency and having four equal segments (each, consequently, of 90°) which are alternately open and closed. If desired, the disc may be divided into only two segments each of 180° of which one is closed and the other is open. In this case, however the number of revolutions must be equal to double the picture frequency in order to obtain the same conditions. It has been found that when as the source of light is utilized a gas- or vapour-filled discharge tube which is fed by an alternating current the frequency of which is not equal to the picture frequency or is not a multiple thereof, it is not possible to suppress flickering with the above-mentioned known-means.

As shown in Figure 1, a shutter 5 serves to intercept the light emitted from a discharge tube 6, supplied with alternating current having a frequency $f$. The discharge tube 6 may be of the type discribed in the above-mentioned application. The shutter 5 has two opaque segments 8 and two transparent segments 9, the angle of the segments 9 being denoted by $\alpha$.

In accordance with the present invention the value of the angles $\alpha$, i. e., the angles of the open segments 8, is computed in accordance with the following formula:

$$\alpha = p \cdot \frac{n}{2f} \cdot 360° \tag{1}$$

in which the formula $p$, $n$ and $f$ represent respectively an arbitrary integer, the picture frequency and the alternating current frequency.

It is recommended in this case to choose an arrangement of the segments which is as symmetrical as possible and consequently to choose the closed and the open segments so as to be approximately equal in order to prevent the production of flicker due to other causes.

If 24 pictures are to be projected per second, and if the alternating current frequency is 50 cycles, the value of angle α may be computed as follows:

$$\alpha = p \cdot \frac{24}{2.50} \cdot 360° = p \cdot 86.4° \qquad (2)$$

If the shutter disc rotates with the picture frequency, $p$ is preferably made equal to 1. If, as is customary, use is made of two closed and two open segments which are symmetrically arranged, each of the open segments will be 86.4° and each of the closed segments 93.6°. A small tolerance is admissible for practical reasons without the projection being deteriorated. A shutter disc having these dimensions is illustrated in Fig. 2.

If the shutter disc rotates with double the picture frequency, $p$ must be given the value 2 whereas in this case the disc need only have two segments viz. one open segment of $2 \times 86.4° = 172.8°$ and one closed segment of 187.2°.

If another picture and/or alternating current frequency is utilized, the value of the angle α may be readily calculated by Formula (1).

The operation of a shutter device according to the invention, as compared with the usual shutter devices, will be more clearly understood by referring to Figs. 3 and 4.

Figure 3 shows, as a function of the time, the quantity of light emitted by a discharge tube, such as the tube 6 of Figure 1, if the tube is supplied with alternating current of 50 cycles.

Figure 4 shows, in synchronism with Figure 3, the projection periods and the masking periods in the case of a usual shutter disc utilized for the projection of 24 pictures per second. By a usual shutter disc is meant a shutter disc having four 90 degree segments which are alternately open and closed and rotating with the picture frequency. The projection periods are represented by hatched rectangles. In Figure 3, the hatched areas, together with the more closely hatched areas 11 to 14, indicate the quantities of light which are allowed to pass through each open segment. As may be easily seen from Figure 3, through each open segment the light of more than half a period is allowed to pass, the excess light being indicated by the areas 11 to 14. It should be noted that the quantities of light represented by the areas 11 to 14 are not equal to each other but vary. In the case shown, which is the most common, this variation in the quantity of light has a frequency of 4 periods per second, and as such a frequency is easily followed by the eye it is very troublesome. The light variation of the tube itself is not troublesome as this frequency, which in the case of alternating current of 50 cycles is consequently 100, cannot be perceived by the eye. According to the invention, the low-frequency light variations—in the above case the variations in light caused by the excess areas 11 to 14 and having a frequency of 4 per second—are eliminated by dimensioning the open segments of the shutter so that each projection period is equal to half a cycle of the alternating current feeding the light source. As shown in Fig. 4, with the use of the usual shutter the projection periods are terminated by the solid lines. When using a shutter in accordance with the invention, the projection periods are terminated by the dotted lines 15 to 18, whereby the excess quantities of light represented by areas 11 to 14 are eliminated and difficulties due to low-frequency variation are overcome.

As has been mentioned, the invention is not limited to those cases in which alternating current is utilized for feeding the discharge tube, but is adapted for use in any case in which the light varies periodically. If the duration of each period of the light emitted is designated by T, the Formula (1) may be written as follows:

$$\alpha = p \cdot n \cdot T \cdot 360°$$

so that α can be calculated as above indicated.

It is consequently also possible to use the inventive idea if three-phase current is utilized for operating the lamp.

What I claim is:

1. In a device for intermittently illuminating motion picture films, in combination, a light source emitting periodically-varying light of a frequency other than a multiple of the picture frequency, and a rotary shutter rotating with a frequency equal to a multiple of the picture frequency and having a transparent segment, the angle of said segment being equal to the product of an integer times the picture frequency times 360° divided by twice the frequency of the emitted light.

2. In a device for intermittently illuminating motion picture films, in combination, a discharge tube having a gaseous filling, an alternating current supply for said tube having a frequency other than a multiple of the picture frequency, and a rotary shutter rotating at a frequency equal to a multiple of the picture frequency and having a transparent segment, the angle of said segment being equal to an integer times the picture frequency times 360° divided by twice the alternating current frequency.

3. A shutter for intermittently intercepting the light supplied to a motion picture film by a light source emitting periodically-varying light of a frequency other than a multiple of the picture frequency, comprising opaque segments and transparent segments, the angle of each of said transparent segments being equal to the product of an integer times the picture frequency times 360° divided by twice the frequency of the emitted light, said shutter operating at a frequency equal to a multiple of the picture frequency.

4. In a motion picture projector, in combination, a discharge tube having a gaseous filling, an alternating current supply for said tube having a frequency other than a multiple of the picture frequency, and a rotary shutter rotating at a frequency equal to the picture frequency and having transparent segments, the angle of each of said segments being equal to the product of an integer times the picture frequency times 360° divided by twice the alternating current frequency.

WILLEM ELENBAAS.